United States Patent [19]

Seto et al.

[11] Patent Number: 4,862,497
[45] Date of Patent: Aug. 29, 1989

[54] HYBRID ALPHANUMERIC TELEPHONE DIRECTORY

[75] Inventors: Raymond A. Seto, Nepean; Marc P. Soubliere, Mississauga, both of Canada

[73] Assignee: Telequest Systems Corporation, Ottawa, Canada

[21] Appl. No.: 134,141

[22] Filed: Dec. 17, 1987

[30] Foreign Application Priority Data

Dec. 30, 1986 [CA] Canada .................................. 526464

[51] Int. Cl.$^4$ ........................................... H04M 1/272
[52] U.S. Cl. ...................................... 379/355; 341/31; 364/709.10
[58] Field of Search ............... 379/355, 357, 359, 352, 379/356; 206/481; 40/371, 388, 390; 250/222.1; 341/31, 23; 364/709.10, 188, 189, 190; 84/1.03

[56] References Cited

U.S. PATENT DOCUMENTS

| | | | |
|---|---|---|---|
| 3,495,229 | 2/1970 | Kuehnle | 379/356 X |
| 3,600,592 | 8/1971 | Mahan | 341/31 X |
| 4,543,452 | 9/1985 | Ippen | 379/355 X |
| 4,631,700 | 12/1986 | Lapeyre | 364/709.1 |
| 4,661,976 | 4/1987 | Basch | 379/355 X |
| 4,736,098 | 4/1988 | Rehrig | 250/222.1 |

FOREIGN PATENT DOCUMENTS

| | | | |
|---|---|---|---|
| 0140457 | 11/1981 | Japan | 364/709.1 |
| 0096443 | 6/1983 | Japan | 379/357 |
| 2063010 | 5/1981 | United Kingdom | 379/357 |

*Primary Examiner*—Jin F. Ng
*Assistant Examiner*—Randall S. Vaas
*Attorney, Agent, or Firm*—Fleit, Jacobson, Cohn, Price, Holman & Stern

[57] ABSTRACT

A hybrid alphanumeric directory comprises a portable notebook containing a plurality of loosely bound pages, each of which has several writing areas where alphanumeric information can be entered. The writing areas are on each page in the same relative position. When the notebook is placed on the receiving surface of an electronic unit, an arrangement is provided to determine which page is open and this automatically associates the push-buttons with the respective writing areas of the open page. Data associated with the writing areas are electronically stored. When a push-button beside a writing area of an open page is depressed, an operation associated with the stored data pertaining to that writing area is automatically initiated. The directory is particularly useful as a telephone directory, in which case the data are stored telephone numbers. Depression of one of the push-buttons causes the stored telephone number to be automatically dialed.

17 Claims, 5 Drawing Sheets

HYBRID ALPHANUMERIC TELEPHONE DIRECTORY

This invention relates to a hybrid alphanumeric directory, particularly useful as a semi-automatic telephone directory.

Automatic telephone dialers are commercially available. These comprise some form of memory for storing a series of pre-selected, frequently-called numbers, and a series of push-buttons, each associated with the name of the called subscriber. In order to place a call, the caller merely depresses the appropriate push-button. This arrangement is unsatisfactory if a large number of telephone numbers are stored, since a push-button is required for each listing. Also, additional information, such as the address of the called subscriber, cannot be conveniently associated with the push-buttons. It is possible to store names, addresses and telephone numbers in purely electronic form, but this requires the use of an alphanumeric display, keyboard and a substantial amount of memory, which cannot be justified for a small capacity system of the type used with a personal telephone set.

An object of the invention is to provide a telephone directory for use with a small capacity system that alleviates the problems of the prior art.

According to the present invention there is provided a hybrid alphanumeric directory, comprising: a portable note book having a plurality of bound pages which can be opened to expose a desired page, each page having a plurality of writing areas in the same relative positions where alphanumeric information can be entered; and an electronic unit comprising a receiving surface on which said note book can be placed, a plurality of actuators associated with said respective relative positions when said note book is placed on the receiving surface, a memory for electronically storing data associated respectively with each writing area, means for indicating which page is exposed, and means responsive to an output from said indicating means to associate said actuator with the respective data associated with the writing areas of the exposed page, whereby actuation of one of said actuators initiates an operation dependent on the stored data associated with the writing area associated with said one actuator.

The hybrid nature of the directory permits the electronic memory requirement to be kept reasonably small and obviates the need for an elaborate alphanumeric display. If desired, an electronic display can be provided for the stored data, but this would normally take the form of a simple digital read-out. Also the note book can be removed and thereby serve as an ordinary address book.

One application of the directory is as a telephone directory, in which case the names and addresses are entered in the writing areas, and the corresponding telephone numbers are stored in the memory. In order to initiate a call, the user turns to the appropriate page and depresses the actuator, usually in the form of a button, beside the desired name and address. The button is automatically associated with the correct telephone number for that writing area, and automatic initiation of the call occurs by means of the number stored in the memory.

The notebook can be removed and used as a conventional notebook or address book. In a preferred embodiment, the electronic unit is provided with means for identifying the particular notebook currently on the receiving surface and means for storing different sets of data associated with different notebooks. For example, each notebook can contain a different category of information. The identifying means can be an automatic detector responsive to a code on the notebook, such as a sequence of tabs, or can be a simple switch actuated by the user.

The hybrid directory has many of the advantages of a full-scale electronic system without the disadvantages relating to cost and complexity. Full names and addresses of the subscribers can be entered on the pages of the directory, and these are conveniently accessible to the user. In a preferred embodiment, the pages are bound together by a loose-leaf binder. This enables the user to remove and replace pages as required. The pages may conveniently be made of an opaque, plastic material to allow entries to be conveniently erased. Adhesive tabs can be used to permit manuscript entries to be conveniently changed.

In a preferred embodiment, the detector comprises a series of reflective photo-detectors responsive to the presence of tabs located in different relative positions on the pages of the directory. As the pages are turned, the photo detectors are successively covered up. Alternatively, a series of holes can be arranged in register, with each page having one less hole than the previous page so that the holes are successively covered up as the pages are turned.

The directory may be conveniently incorporated into an integrated desk unit of the type described in our copending application No. 431,723, filed July 4, 1983.

The invention will now be described in more detail, by way of example only, with reference to the accompanying drawings, in which.

Figure 1:
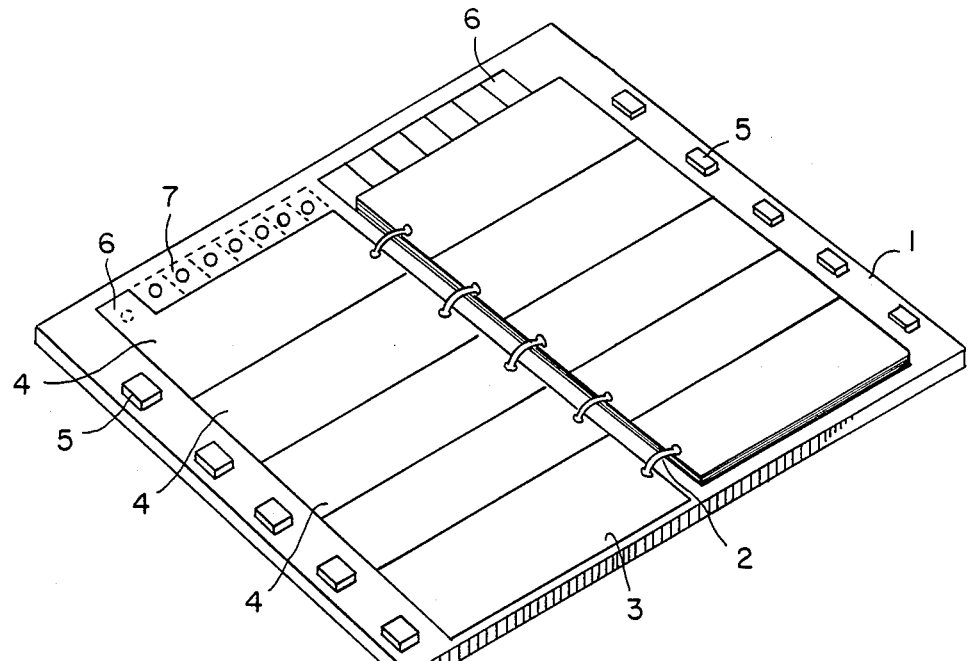
FIG. 1 is a perspective view of a hybrid alphanumeric telephone directory.

The hybrid alphanumeric telephone directory shown in FIG. 1 comprises a base-plate 1 defining a receiving surface on which is placed a loose-leaf, ring binder 2 having a series of pages 3 made of a robust, opaque plastic material with a writing surface divided into five rectangular areas 4. The receiving surface may be in a recess adapted to accommodate the notebook. Alphanumeric information, such as the name, address, and telephone number, of a subscriber can be manually entered on the writing areas 4. The plastic material allows this information to be easily erased and new information entered. Also, the loose-leaf ring binder allows pages to be removed and replaced Peel-off adhesive tabs can be placed on the writing areas to permit the written entries to be changed.

A button 5 is located immediately beside each writing area 4 and is associated with the relative position of its adjacent writing area. Each page 3 has along its upper edge a unique projecting tab 6. On the base 1 at the top of the left-hand page are arranged a series of reflective photo detectors 7 immediately beneath the projecting tabs when all the pages are on the left side of the directory. The tabs 6 are arranged in the manner of an index such that as each page 3 is turned over, the reflective photo detectors 7 are successively uncovered or vice versa. FIG. 1 shows the directory open to the first page, with the first tab 6 covering the first photo detector 7. When the second page is turned, the next tab 6 covers the next photo detector and so on. The photo detectors are of the reflective type, that is to say they radiate light and respond to the light 20 reflected from the tabs. For optimum reflectivity, the pages should be white, although metallic reflector material can be applied to the tabs 6 as required.

High ambient light conditions can cause false detection. To overcome this problem, an infrared filter can be placed over the detectors, or alternatively the photo emitters can be digitally pulsed and the detectors made to respond only to the same series of pulses before giving a valid detection signal.

The photo detectors 7 automatically associate the buttons 5 with the adjacent writing area of the open page. In FIG. 1, the ten buttons 5 are associated with ten writing areas, and hence ten names and addresses. If the caller wishes to dial the number of the subscriber entered in the first writing area 4', he depresses the button 5 beside that writing area. The directory is associated with an automatic dialer, which automatically dials the number of that subscriber. Depression of the remaining buttons allows the nine subscribers entered in the remaining writing areas to be called again by depression of the single button alongside the writing areas. When the page is turned, the photo detector automatically disassociates the buttons 5 from the previous writing areas and associates them with the writing areas on the newly open pages. The same ten buttons can then be used to call another ten subscribers, and this process can be repeated as each page is turned. For example, with ten pages, the te buttons can be used to call up to one hundred subscribers.

In practice, the number of directory pages that can be accommodated is limited by the maximum number of reflective photo detectors that can be installed and the maximum distance that a tab can be from a photo detector and still be detected. As the pages are turned over, the tabs on the newly turned pages become progressively further from the photo detectors. This problem can be alleviated by stepping the photo detectors at progressively higher levels so that they remain at substantially the same distance from their associated tabs. Preferably the directory pages are arranged in the loose-leaf binder so that the whole binder can be removed and used as a simple pocket directory without necessarily being associated with the hybrid unit.

Figure 2:
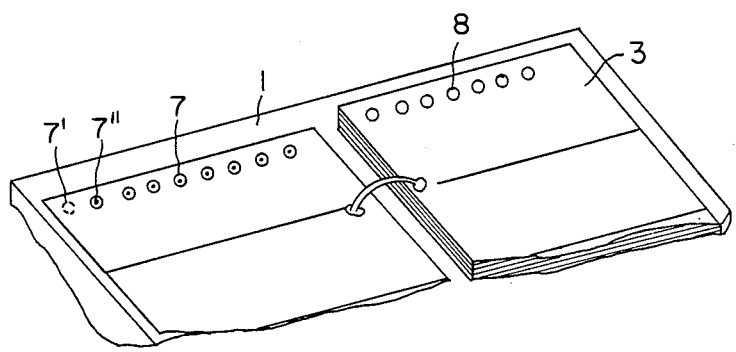
FIG. 2 is a detail of a second embodiment of the telephone directory.

An alternative method of detecting the open pages is to punch a series of holes 8 in the pages 3 as shown in FIG. 2. The holes are in register. Each page has successively less holes. The first page has a row of holes which expose all the photo detectors 7 except for the last one 7' The next page has one less hole so that the next photo detector 7" is covered and so on. The detection arrangement is similar to that shown in FIG. 1. As the pages are turned onto the left side, the photo detectors 7 are progressively covered up. The use of photo detectors is preferred for detecting the open pages since no moving parts are employed. However, it should be understood that other detection systems can be employed.

Figure 5A:
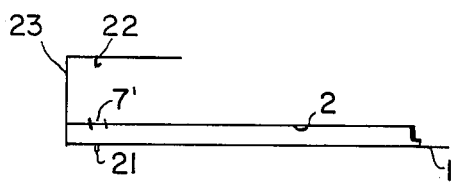
FIGS. 5a and 5b show alternative arrangements of light sources and detectors.
Figure 5B:
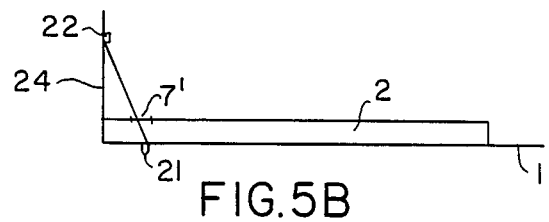

With the arrangement shown in FIGS. 5a and 5b, pairs of light sources 21 and photo detectors 22 may be employed. The light sources 21 are located on the baseplate under the holes and the detectors 23 are located on a frame 23 overhanging the edge of the page (FIG. 5a) or vice versa. Alternatively, a shoulder (FIG. 5b) can be provided for the the note book 2 to abut against. In this case, the photo detectors 22 are mounted in the vertical wall of the shoulder and the light path between the light sources and detectors is inclined.

Figure 3:
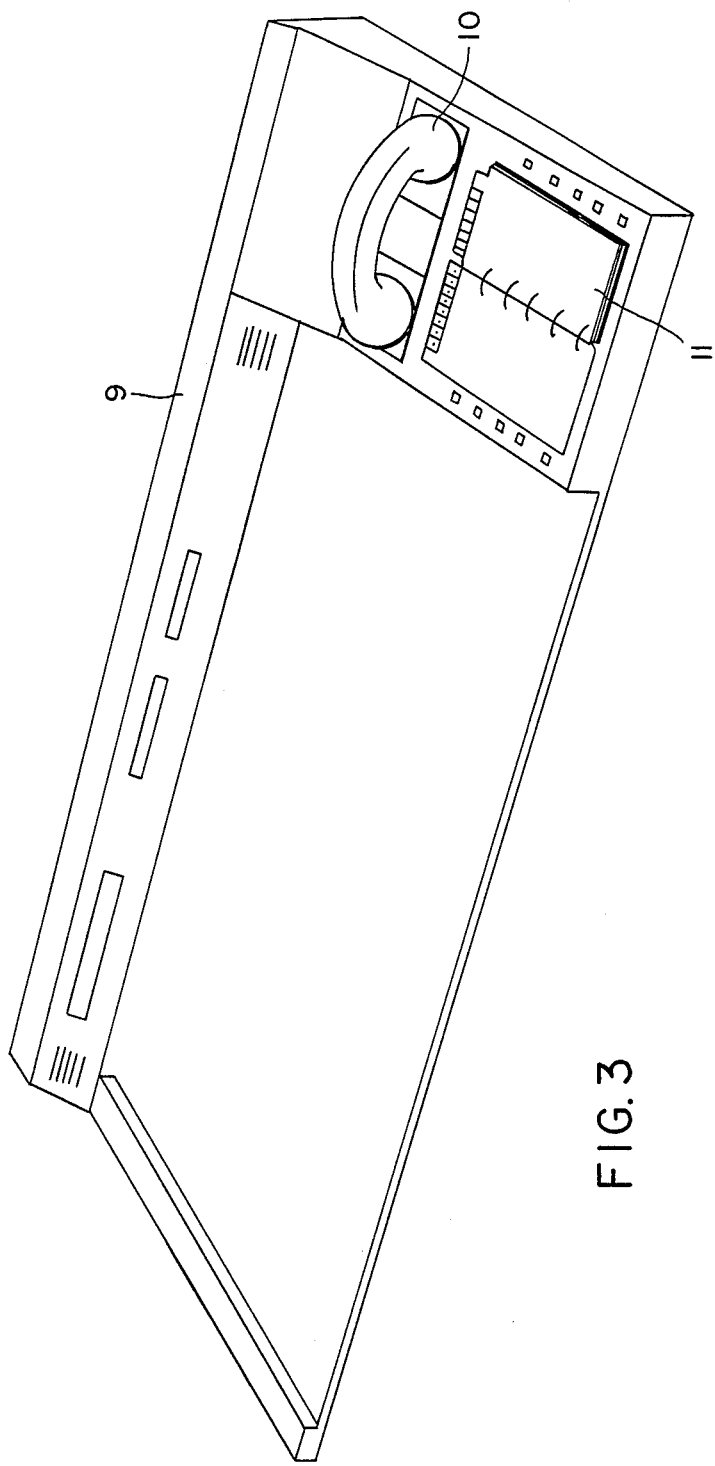
FIG. 3 is a general view showing the directory incorporated into an integrated desk unit.

FIG. 3 shows in general terms how the directory can be incorporated into an integrated desk unit 9 having an integral telephone set 10. The hybrid directory is generally referenced 11 In order to place a call, the caller merely has to lift the hand set, turn the directory to the page where the person he wishes to call is to be found, and depress the button alongside that person's entry. An automatic dialer built into the desk unit then electronically transmits the necessary pulses down the telephone line. To assist in locating the desired subscriber, conventional indexing tabs can be provided along the side edges of the pages of the directory.

The telephone numbers are stored in an electronic memory, and these can be entered by means of a conventional key pad. The user places the directory in the program mode, turns to the desired page, manually enters information in one of the writing areas, depresses the associated button, and enters the telephone number in the key-pad. From that moment on, the directory will associate that number with the button beside that particular writing area.

A simple, seven-segment digital read-out can be provided to display the telephone number. However, unlike the prior art, an elaborate alphanumeric display is not required, since the alphanumeric information is conveniently available to the user in readable form on the pages of the directory.

Figure 4:
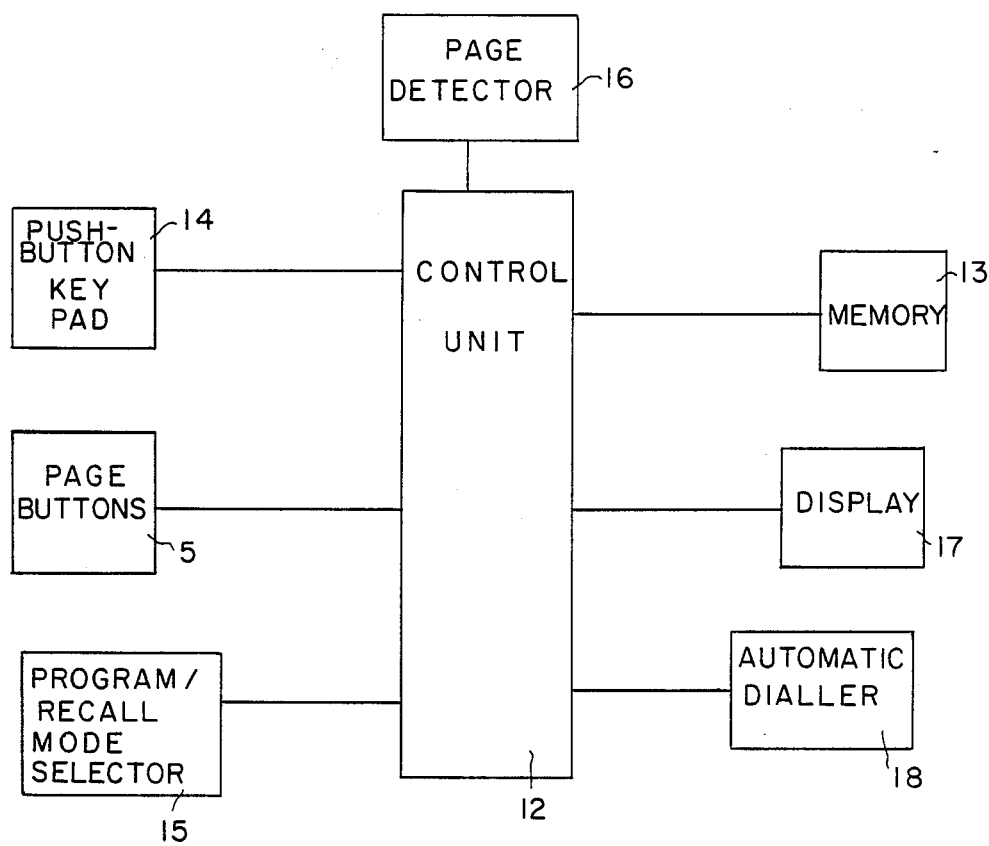
FIG. 4 is a block diagram of a control circuit for the alphanumeric directory.

A block diagram of the directory control system is shown in FIG. 4. The page buttons 5 are connected to a control unit 12. In the program mode, selected by the program/recall mode selector 15, a number can be stored in the memory 13 by depressing the appropriate page button and entering the number in the push-button key pad 14. In the normal recall mode, depression of a page button 5 causes the number associated with a specific writing area on the associated page, as determined by the page detector 16, to be displayed in display 17 and sent to the automatic dialer 18, whereupon the desired subscriber is automatically called.

The opaque plastic material allows the user to erase manual entries with a conventional eraser. To change the stored number, the subscriber once again puts the directory into the program mode, turns to the desired page, presses the appropriate button, enters the telephone number into the memory through the key pad, and returns the directory to the normal recall mode. The new information can be manually entered into the appropriate writing area. If desired, a whole page can course be replaced by a fresh page after repeated use.

If a true alphanumeric arrangement is to be maintained, insertion of entries is difficult because the remaining entries have to be erased and moved down one space. For some applications, it may be desired to have one page for each letter of the alphabet in the manner of a conventional address book. This can be achieved with the arrangement shown in FIG. 2 by having more than one row of holes to accommodate the necessary number of photo-detectors. For example, with ten photo detectors in each row, the pages would progressively cover up the photo-detectors of the first row, then the second row and so on. With a larger number of pages, alignment of the pages becomes more critical.

In a further embodiment, notebooks containing different information can be placed on the receiving surface of the base plate. Different sets of data corresponding to the different notebooks are stored in the memory. The notebook on the receiving surface must be identified and this can be done either manually with a selector switch or button or automatically with a detector, such as a microswitch, capable of determining which notebook is present. For this purpose the notebooks can be coded with holes, tabs or some other means to which a detector can respond.

A further useful application of the directory is found in computer applications. A programmer can have input commands permanently in front of him on hard copy in a manual to permit him to browse through the commands without interfering with the computer display. To input a command, the programmer opens the manual to the appropriate page and selects the desired entry. Such an arrangement can be used in many other applications where an operator has to initiate operations with reference to a manual.

Figure 6:
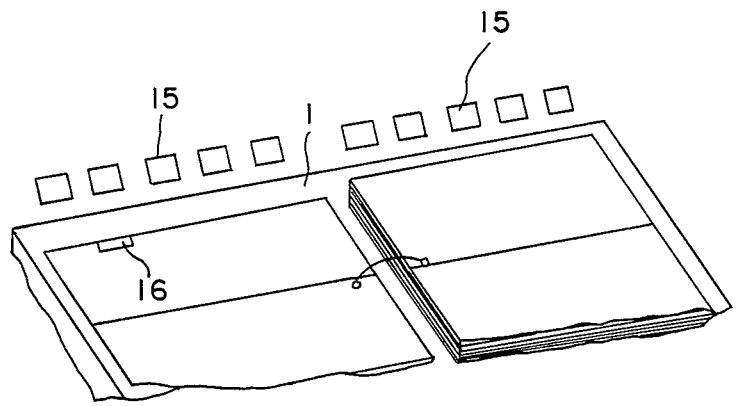
FIG. 6 shows a portion of a third embodiment of the hybrid alphanumeric telephone directory.

In the embodiment shown in FIG. 6, a row of buttons 15 is located along the top edge of the baseplate 1. A tab 16 is placed on the upper edge of each page adjacent one of the buttons 15. The buttons take the place of the photo-detectors 7 in the previous embodiment. Instead of the system automatically detecting which page is exposed, the user first presses one of the buttons 15 alongside the tab 16 of the exposed page. Tabs 16 are arranged in unique locations on each page. The user can press one of the side buttons 5, as in the previous embodiments, to call up the number in the memory location associated with the adjacent writing area.

The notebook can conveniently be employed as a hotel services directory, in which case an electronic desk unit can be located in each room. The hotel guest can quickly access hotel services by pressing the appropriate buttons. Also, advertising space can be sold to local restaurants and the like.

Figure 7:
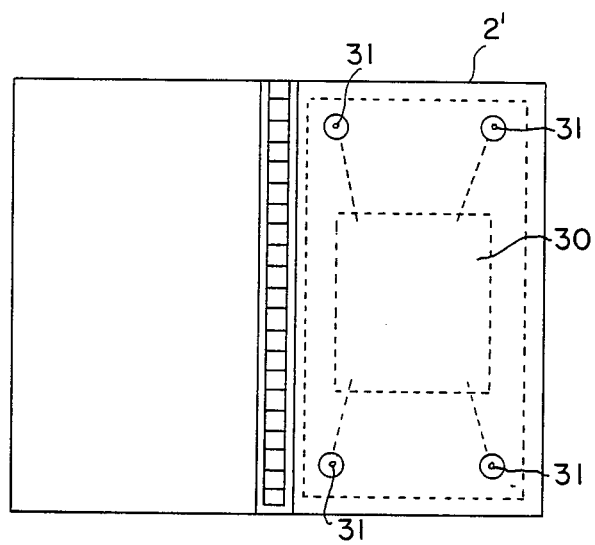
FIG. 7 is a plan view of a booklet incorporating an electronic module in accordance with the further embodiment of the invention.

The booklet 2¹ shown in FIG. 7 is similar to the ring binder 2 shown in FIG. 1 with the exception that instead of the data associated with the visual entries in the booklet being stored in the fixed unit, an electronic module 30 storing the data is incorporated in the cover of the booklet 2¹. The module 30 can be made lightweight and inconspicuous so that it does not significantly add to the bulk of the booklet 2¹.

The booklet can be conveniently located on the base unit be means of magnetic snap-in clasps 31 that can also establish the necessary electrical connections. The booklet otherwise works in essentially the same manner as the booklet described with reference to FIGS. 1 and 2.

The advantage of this arrangement, however, is that when the user removes the booklet 2¹, the electronic data is carried with the booklet. For example, if the user has a compatible base unit in the office and the home, he can carry the booklet between locations without having to reenter the data into the base unit.

Figure 8:
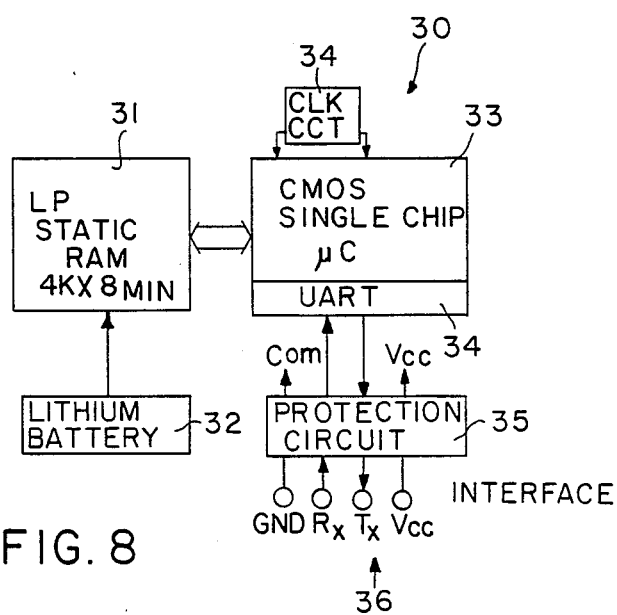
FIG. 8 is a block diagram of a communications device for incorporation in the booklet.

FIG. 8 is a block diagram of the electronic module. This consists of a 4K by 8 LP static ram 31 powered by a lithium battery 32 connected to a CMOS single chip microprocessor 33 driven by a clock circuit 34. The microprocessor 33 has a UART 34 for connection to the base unit through a protection circuit 35 and serial interface 36.

When the booklet has an onboard microprocessor, another advantage is that this can be used in a smart card environment. The booklet can be designed to communicate, for instance, with bank data so as to update account information, for example, stored in the electronic memory. The user can assign a data area in the booklet corresponding to a particular key combination as, for example, a Visa TM entry. By turning to this data area and pressing the associated keys, the user can access his Visa TM account balance. The booklet has general application as a novel input device, particularly in computer applications. Many people, particularly novice users, do not find a computer screen an efficient medium for browsing through a number of records prior to making a selection. The advantage of the directory booklet is that when used as an input device, it permits the user to browse through the data entry areas in a conventional manner prior to making a selection. All the user then has to do is press the appropriate page and entry combinations to direct the appropriate input to the attached device.

For example, the booklet could be used as anoperator's manual in a manufacturing environment. The process choices can be identified in the date entry areas. The operator can initiate a sequence of operations specified in the data entry area merely by activating the buttons associated with that data entry area.

There are other uses. For example, the booklet is a useful input device for pictographic languages, which have a large number of characters that cannot be conveniently represented on a keyboard. In the consumer industry, the device can be used to store product categories and generate output dependent on selected product categories. The device enables the power of computer memory menus to be substantially expanded.

The number of data entry areas can be increased bynesting groups of pages. For example, two hundred and fifty-six (256) possible combinations can easily be obtained by forming a square array with eight buttons on each side of the square. If the top and bottom rows are used to identify the pages, sixteen double page displays can be identified. The eight buttons on each side can then be used to identify eight data entry area on each page, giving a total of two hundred and fifty-six possible data entry areas. The addition of a single extra button to identify a second group of pages will give another two hundred and fifty-six data entries. Thus, in, for example, a product environment, the products could be grouped into categories, each category being associated with a group of colour-coded pages. The addition of a second row of eight buttons along the bottom, each of which is associated with a product category, increases the total number of possible combinations to two thousand and forty eight (2,048). An additional row across the top would increase the number of combinations to four thousand and ninety six (4,096).

In this way a substantial process control manual can be built-up, where all the operator has to do in order to initiate a particular sequence is to look up the desired procedure in the manual and press three buttons, in the manual mode, to initiate the control sequence associated with that procedure.

We claim:

1. A hybrid alphanumeric directory comprising, in combination: a portable notebook having a plurality of bound pages which can be opened to expose a desired page, each page having a plurality of writing areas in the same relative positions where alphanumeric information can be entered, and an electronic memory attached to said notebook for electronically storing data associated respectively with each writing area; and a base unit comprising an electronic control unit, a receiving surface on which said notebook can be located, fastening means for detachably fastening said notebook to said receiving surface, means for establishing electrical connection between said control unit and said electronic memory attached to said notebook, a plurality of actuators associated with said respective relative positions when said notebook is fastened to said base unit on said receiving surface, means for indicating which page is exposed, and means responsive to an output from said indicating means to associate said actuators with the respective data associated with the writing areas of the exposed page, whereby actuation of one of said actuators initiates an operation dependent on the stored data associated with the writing area associated with said one actuator.

2. A hybrid alphanumeric directory as claimed in claim 1, further comprising means for entering said data into the memory, said entering means being responsive to an output from the indicating means to ensure that each data entry is associated with the appropriate writing area of the exposed page.

3. A hybrid alphanumeric directory as claimed in claim 1, wherein said actuator comprises buttons located beside the respective relative positions of the writing areas of each page.

4. A hybrid alphanumeric directory as claimed in claim 3, wherein said pages are bound by means of a loose-leaf binder, and two columns of buttons are located respectively beside each exposed page.

5. A hybrid alphanumeric directory as claimed in claim 4, wherein said pages comprise an opaque plastic material which permits easy erasure of written material.

6. A hybrid alphanumeric directory as claimed in claim 1, wherein said indicating means comprises an actuator operable by the user to indicate the exposed page.

7. A hybrid alphanumeric directory as claimed in claim 1, wherein said indicator means comprises a detector for automatically detecting which page is exposed.

8. A hybrid alphanumeric directory as claimed in claim 7, wherein each said page has a tab in a unique relative position, and said detector means comprises a plurality of photo detectors responsive to the presence of said tabs to determine which page is exposed.

9. A hybrid alphanumeric directory as claimed in claim 8, wherein said photo detectors are of the reflective type and are responsive to radiation reflected from an overlapping tab.

10. A hybrid alphanumeric directory as claimed in claim 8, wherein a series of holes is formed in each page such that the holes of the different pages are in register, successive pages having progressively fewer holes, and said detector means comprises a plurality of reflective photo detectors in register with said holes, whereby as the pages are turned said photo detectors are progressively covered up.

11. A hybrid alphanumeric directory as claimed in claim 1, wherein said data comprises telephone numbers, and actuation of one of said actuators initiates dialing of the telephone number associated therewith for the exposed page.

12. A hybrid alphanumeric directory as claimed in claim 10, further comprising an electronic display for displaying said telephone numbers.

13. A hybrid alphanumeric directory as claimed in claim 1, further comprising adhesive labels adapted to be placed on said writing areas.

14. A hybrid alphanumeric directory as claimed in claim 1 wherein said electrical connection between said control unit and said electronic memory is established through said fastening means.

15. A hybrid alphanumeric directory as claimed in claim 14, wherein said fastening means comprise magnetic clasps.

16. A hybrid alphanumeric directory as claimed in claim 1, wherein the pages are arranged in groups, only one group being active at at time and each group being associated with the same actuators and means for indicating which page is exposed, the directory further comprising means for indicating which group is active, whereby the pages can be nested to a plurality of levels to increase the capacity of the directory.

17. A hybrid alphanumeric director as claimed in claim 1, further comprising means for establishing communication with a mainframe computer to access data stored therein.

* * * * *